(12) United States Patent
Li et al.

(10) Patent No.: US 9,840,843 B2
(45) Date of Patent: Dec. 12, 2017

(54) GYPSUM PRODUCTS WITH IMPROVED GLASS FIBER MAT

(71) Applicant: United States Gypsum Company, Chicago, IL (US)

(72) Inventors: Alfred Li, Naperville, IL (US); Wei Xu, Vernon Hills, IL (US); Mark B. Scalf, McHenry, IL (US); David Song, Vernon Hills, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 343 days.

(21) Appl. No.: 14/451,817

(22) Filed: Aug. 5, 2014

(65) Prior Publication Data

US 2016/0040427 A1    Feb. 11, 2016

(51) Int. Cl.
| | | |
|---|---|---|
| *E04C 2/26* | (2006.01) |
| *B32B 38/08* | (2006.01) |
| *B32B 37/24* | (2006.01) |
| *B32B 37/10* | (2006.01) |
| *E04C 2/04* | (2006.01) |
| *E04C 2/24* | (2006.01) |
| *B32B 5/02* | (2006.01) |
| *B32B 13/14* | (2006.01) |

(52) U.S. Cl.
CPC ............... *E04C 2/26* (2013.01); *B32B 5/022* (2013.01); *B32B 13/14* (2013.01); *B32B 37/10* (2013.01); *B32B 37/24* (2013.01); *B32B 38/08* (2013.01); *E04C 2/043* (2013.01); *E04C 2/246* (2013.01); *B32B 2037/243* (2013.01); *B32B 2250/40* (2013.01); *B32B 2260/021* (2013.01); *B32B 2260/023* (2013.01); *B32B 2260/046* (2013.01); *B32B 2262/101* (2013.01); *B32B 2315/00* (2013.01); *B32B 2419/00* (2013.01); *B32B 2607/00* (2013.01)

(58) Field of Classification Search
CPC . E04C 2/26; E04C 2/246; E04C 2/043; B32B 37/10; B32B 5/022; B32B 13/14; B32B 37/24; B32B 38/08; B32B 2250/40; B32B 2315/00; B32B 2419/00; B32B 2037/243; B32B 2607/00; B32B 2260/021; B32B 2260/023; B32B 2262/101; B32B 2260/046
See application file for complete search history.

(56) References Cited

U.S. PATENT DOCUMENTS

| | | |
|---|---|---|
| 4,233,358 A | 11/1980 | Jones et al. |
| 4,784,897 A | 11/1988 | Brands et al. |
| 4,810,569 A | 3/1989 | Lehnert et al. |
| 4,948,647 A | 8/1990 | Burkard |

(Continued)

OTHER PUBLICATIONS

"Polymer Curing Technologies", vol. 32, No. 1, May/Jun. 2011, pp. 1-40.

(Continued)

*Primary Examiner* — Robert J Grun
(74) *Attorney, Agent, or Firm* — Greer, Burns & Crain, Ltd.; Pradip Sahu; Philip T. Petti

(57) ABSTRACT

A gypsum product with improved elasticity and increased nail-pull strength is provided, the product made with a glass fiber mat in which glass fibers are cross-linked with a polymeric resin. Further embodiments provide methods for making the glass fiber mats and gypsum products.

9 Claims, 4 Drawing Sheets

(56) References Cited

U.S. PATENT DOCUMENTS

| | | | |
|---|---|---|---|
| 5,772,846 | A | 6/1998 | Jaffee |
| 5,837,621 | A | 11/1998 | Kajander |
| 5,883,024 | A | 3/1999 | O'Haver-Smith et al. |
| 6,187,697 | B1 | 2/2001 | Jaffee et al. |
| 6,432,482 | B1 | 8/2002 | Jaffee et al. |
| 6,524,679 | B2 | 2/2003 | Hauber et al. |
| 6,579,413 | B1 | 6/2003 | Grove |
| 8,053,528 | B2 | 11/2011 | Shoemake |
| 8,084,378 | B2 | 12/2011 | Jaffee et al. |
| 8,128,767 | B2 | 3/2012 | Jaffee |
| 8,329,308 | B2 | 12/2012 | Liu et al. |
| 8,461,067 | B2 | 6/2013 | Smith et al. |
| 2002/0187296 | A1 | 12/2002 | Hauber et al. |
| 2005/0136241 | A1 | 6/2005 | Kajander et al. |
| 2005/0266225 | A1 | 12/2005 | Currier et al. |
| 2006/0240236 | A1 | 10/2006 | Bland et al. |
| 2007/0012414 | A1 | 1/2007 | Kajander et al. |
| 2007/0093159 | A1 | 4/2007 | Kajander |
| 2007/0197114 | A1 | 8/2007 | Grove |
| 2009/0223618 | A1 | 9/2009 | Smith |
| 2010/0143682 | A1 | 6/2010 | Shake et al. |
| 2011/0086214 | A1 | 4/2011 | Rockwell |
| 2016/0052168 | A1* | 2/2016 | Li .................... B32B 13/14 428/469 |

OTHER PUBLICATIONS

"A Broader Base for your Success", Polymer Dispersions for Fiber Bonding, Acrodur, pp. 1-6.

Acrodur—a Binder With Versatile Advantages, Polymer Dispersions for Fiber Bonding, Acrodur, pp. 1-4.

"Recommended Levels of Gypsum Board Finish" Cisca, GA214-10, pp. 1-4.

"Finishing and Decorating Glass-Mat Gypsum Panels", United States Gypsum Company, 2012, pp. 1-3.

* cited by examiner

GYPSUM PRODUCTS WITH IMPROVED GLASS FIBER MAT

FIELD OF THE INVENTION

This invention provides gypsum products made with improved glass fiber mats, and compositions and methods for manufacturing these products.

BACKGROUND

Various gypsum products, including wall panels, ceiling panels and tiles, are commonly used in the construction industry. Many of these gypsum products are made by preparing an aqueous gypsum slurry with calcined gypsum (calcium sulfate alpha hemihydrate, calcium sulfate beta hemihydrate and/or calcium sulfate anhydrate), shaping the slurry and then allowing the slurry to harden by rehydrating calcined gypsum into gypsum (calcium sulfate dihydrate).

Gypsum panels can be manufactured by sandwiching a gypsum slurry between two cover sheets known as facers. In some applications, a facer is a paper sheet. Such wallboards in which a gypsum slurry is sandwiched between two sheets of paper find many different applications in building construction. However, wallboards may be sensitive to moisture and at least in some applications, other facer materials such as fibrous mats can be used as described for example in U.S. Pat. No. 8,329,308 and US Patent Publication 2010/0143682, both to the United States Gypsum Company, and the teachings of which are incorporated herein by reference. Suitable fibrous mats further include those disclosed in U.S. Pat. No. 5,772,846 and which are made with glass fibers and polyester fibers bound together.

While gypsum panels made with glass fiber mats have many advantages, the main disadvantage comes from the glass fiber mat structure in which there are voids between glass fibers which may affect consistency and surface finish of a resulting gypsum panel. Further, glass fibers are brittle and this may negatively affect certain properties of a resulting gypsum panel and result in the loss of structure integrity after exposure to pressure.

US Patent Publication 2011/0086214 laminates one of the glass mat surfaces with a stiffening layer before the mat can be used in making a gypsum product. US Patent Publication 2002/0187296 discloses an assembly line on which a glass fiber mat is vibrated so that voids in the mat are more evenly filled with a gypsum slurry. U.S. Pat. No. 4,948,647 discloses gypsum products with a laminated composite facing of an outer nonwoven fiber mat and an inner woven fiber scrim bound together by an acrylic film. U.S. Pat. No. 6,524,679 discloses gypsum boards with face sheets comprising glass fibers and a combination of set gypsum and polymeric compound. Finally, U.S. Pat. No. 5,837,621 discloses glass fiber mats coated with at least one nitrogen containing compound.

However, the need has remained for obtaining a glass fiber mat which would incorporate properties of a paper facer such as elasticity and the ability to preserve its structure under pressure.

SUMMARY

At least some of these needs are addressed by the present invention. One embodiment provides a gypsum product comprising a gypsum core sandwiched between at least one glass fiber mat in which glass fibers are cross-linked with a polymeric resin. Suitable resins include a polyacrylate, polyester, polystyrene, acrylo-polyester and acrylo-polystyrene. In some embodiments the polymeric resin is an acrylo-polyester cross-lined with the glass fibers by hydroxyl functional groups. Further embodiments include gypsum products in which the glass fibers in the glass fiber mat are pre-pressed, post-pressed or both, in addition to be treated with a polymeric resin.

Further embodiments provide glass fiber mats with pre-pressed randomly oriented glass fibers in which the pre-pressed glass fibers are cross-linked with a polymeric resin such as a polyacrylate, polyester, polystyrene, acrylo-polyester and acrylo-polystyrene. In further embodiments, the glass fibers can be further post-pressed.

Other embodiments provide a method for making a gypsum product in which a gypsum slurry is formed, a glass fiber mat is obtained and soaked in an aqueous polymeric resin solution. The glass fibers in the glass fiber mat are caused to cross-link by curing the resin and a gypsum product is formed by covering the gypsum slurry on at least one side with the glass fiber mat in which glass fibers are cross-linked with the polymeric resin. In this method, the curing step of the resin may be accomplished by exposing the glass fiber mat to a temperature in the range from 200° F. to 500° F. At least in some embodiments, the polymeric resin is selected from the group consisting of a polyacrylate, polystryrene, polyester, acrylo-polyester and acrylo-polystyrene. The glass fiber mats suitable for the method include those which are pre-pressed, post-pressed or both. At least in some embodiments, the glass fiber mat is post-pressed after the gypsum product has been formed. Some embodiments of the method are performed with the polymeric resin which is an acrylo-polyester solution with 50% solids. Yet further embodiments include those in which the steps of soaking and curing take place after the gypsum product is formed.

Additional embodiments include methods for improving elasticity and surface finish in a gypsum product. In these methods, a glass fiber mat is obtained, a gypsum slurry is prepared and disposed on the glass fiber mat and a gypsum product is formed. The glass fiber mat in the gypsum product is then pre-pressed, treated with an acrylic resin and post-pressed.

DETAILED DESCRIPTION

The present invention provides gypsum products, including gypsum panels, with improved nail-pull strength in which a gypsum core is sandwiched between glass fiber mats treated with a thermosetting acrylo-polyester resin. The glass fiber mats can be pre-pressed, post-pressed or both.

Figure 1:
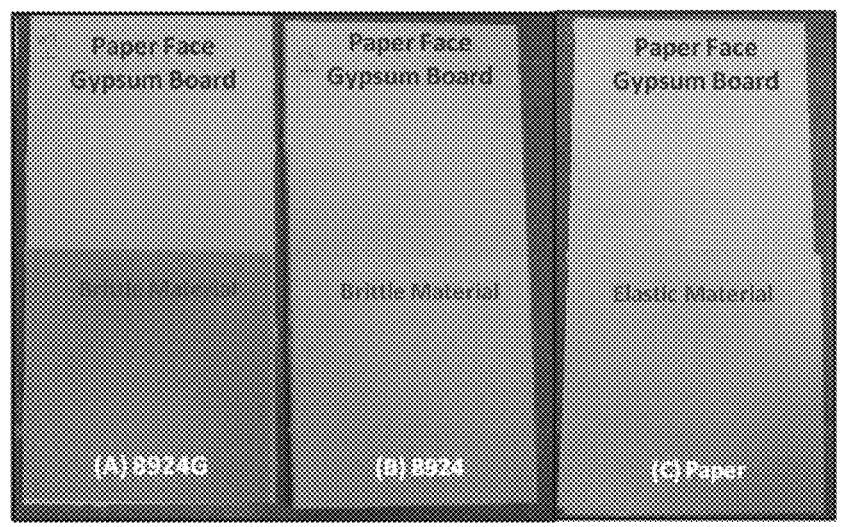
FIG. 1 is a comparative analysis of two glass fiber mats (FIGS. 1A and 1B) with a creamy Manila paper facer (FIG. 1C).

A paper facer, such as a Manila paper facer, has several advantageous properties such as it is elastic and its surface is smooth. However, a typical glass fiber mat is brittle and its surface is uneven as can be seen from FIG. 1, in which two glass fiber mats (FIGS. 1A and 1B) are compared with a Manila paper facer (FIG. 1C).

The inventors have developed a method by which the elasticity of a fiber glass mat is improved. The method also makes the surface of a glass fiber mat more even and smooth. The method improves a nail-pull strength of the glass fiber mat and a gypsum product made with the glass fiber mat.

One embodiment provides a glass fiber mat with improved elasticity and increased nail-pull strength. Further embodiments provide gypsum products made with the glass fiber mats.

Various glass fiber mats without limitations are suitable for making these gypsum products, including mats made with chopped glass fibers, continuous strand glass fibers, mats with random orientation of glass fibers and mixtures therefore.

At least in some embodiments, a glass fiber mat can be prepared from glass fibers which are bound together with at least one binder. Suitable binders include, but are not limited to, a styrene acrylic binder. At least in some embodiments, a glass fiber mat is formulated from glass fibers and a binder such that glass fibers comprise from about 50% to about 80% by weight of the mat and a binder comprises from about 10 to about 30% by weight of the mat. One suitable glass fiber mat is the DuraGlass® 8924 Mat, manufactured by Johns Manville and made with about 70% of glass fibers and about 30% of an acrylic binder.

At least in some embodiments, a glass fiber mat can be formulated with fibers in a length of between about 0.5 to about 2.0 inches and a diameter of between about 6 and about 25 microns. At least in some embodiments, a glass fiber mat is formulated with biosoluble microfibers which have a diameter of about 3 microns. Biosoluble microfibers may comprise from 10% to 90% of all glass fibers.

A glass fiber mat can optionally further comprise fillers, pigments, or other inert or active ingredients. For example, the mat can comprise at least one of a coloring pigment, biocide, fungicide, or mixtures thereof. Such additives can be useful to alter the coloration, modify the structure or texture of the surface, improve resistance to mold or fungus formation, and enhance fire resistance.

One embodiment provides a glass fiber mat which is soaked in a water-soluble acrylic binder and then cured by thermosetting and/or with a chemical compound, referred to as a "hardener," which triggers a cross-linking reaction in the acrylic binder. Various thermoplastic polymers are suitable for soaking a glass fiber mat, including polyacrylate, polystyrene, polyester, polyethylene, polypropylene, polybutylene and mixtures thereof. The inventors have discovered that various curable water-soluble acrylic binders are suitable for this method. Such binders include thermocurable acrylo-polyester binders, including acrylo-polyester binders with hydroxyl functional groups. Acrylo-polyester binders can be prepared as aqueous solutions. Suitable aqueous solutions include solutions with 25 to 75% solids. Suitable aqueous solutions further include solutions with 50% solids. One suitable binder includes a thermosetting acrylo-polyester binder which forms an acrylo-polyester network when blended with hydroxyl-functional groups and exposed to heat, available from HB Fuller under the trade name NF4AD™.

Another embodiment provides a method for improving the tensile strength and elasticity of a glass fiber mat and a gypsum product made with the glass fiber mat. In the method, a glass fiber mat is soaked in a curable acrylo-polyester resin and then the resin is allowed to cure by exposing the soaked mat to heat. In some methods, the resin is cured by placing the soaked glass fiber mat in an oven at a temperature from about 200° F. to about 500° F. In other methods, a polyacrylic resin is cured by UV exposure and/or by adding a chemical compound which triggers polymerization of the resin. Importantly, the polymerization takes place on glass fibers of a glass fiber mat and results in binding and crosslinking of the glass fibers together.

Figure 2:
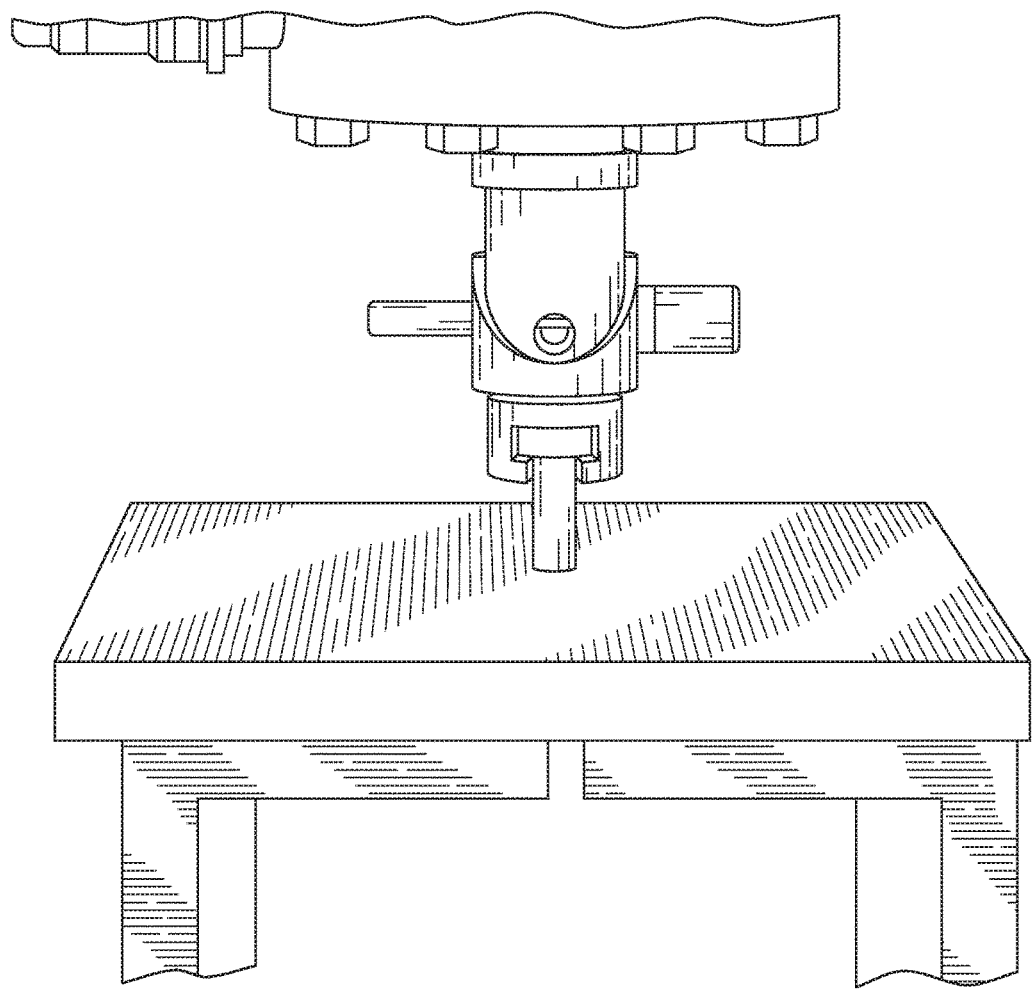
FIG. 2 is a nail-pull test set up.

Nail-pull tests are performed in accordance with the American Society for Testing Materials (ASTM) standard C473-00 and utilize a machine that pulls on a head of a nail inserted in the wallboard to determine the maximum force required to pull the nail head through the wallboard. A set up for a nail-pull test is shown in FIG. 2, where one can appreciate that a face material, such as for example, a glass fiber mat, is compressed as the nail head is pushed down through a gypsum product and the force needed to pull the nail head through the wallboard is recorded.

The inventors developed a method to determine the nail pull strength of various facer materials. In this method, glass fiber mats and a paper facer are glued onto a paper face gypsum board using the 3M Super 77 spray adhesive, as shown in Table 1. Nail-pull tests are performed on the glued facer as well as on the gypsum with a paper facer alone. The differences provided the nail pull gained due to the glued facer material. The nail pull tests are conducted on multiple samples to characterize the statistical information of the nail pull strength of the tested facer materials. Referring to Table 1, various facers (A=glass fiber mat A, B=glass fiber mat B and C=paper facer) were glued to a gypsum board which was also covered with a Manila paper facer. As shown in Table 1, a combination of a glass fiber mat with a Manila paper facer increases by 4 lbf or 5% of the nail pull strength of a gypsum product relative to a gypsum product covered with a paper facer alone.

TABLE 1

| | Lab Test Nail Pull ($lb_f$) Case | | | | | |
|---|---|---|---|---|---|---|
| | A | | B | | C | |
| Board Sample ID | Paper | Paper + 8924G | Paper | Paper + 8924 | Paper | Paper + 47#Paper |
| 1 | 74.3 | 78.7 | 75.4 | 78.5 | 77.4 | 110.3 |
| 2 | 76.4 | 81.4 | 77.8 | 80.9 | 79.2 | 112.0 |
| 3 | 77.4 | 79.5 | 76.5 | 81.1 | 76.2 | 107.2 |
| 4 | 75.5 | 80.2 | 85.5 | 92.3 | 74.4 | 106.1 |
| 5 | 80.0 | 82.7 | 84.4 | 86.3 | 76.0 | 109.2 |
| Ave NP | 76.7 | 80.5 | 79.9 | 83.8 | 76.6 | 109.0 |
| Diff NP | | 3.8 | | 3.9 | | 32.3 |
| % NP Increase | | 5.0 | | 4.9 | | 42.2 |

The inventors have determined that a glass fiber mat is brittle and a gypsum product made with a glass fiber mat cannot withstand the pressure without losing the integrity of its internal structure. The exposure to pressure or load by the nail head during nail pull tests effects negatively the nail-pull strength of a gypsum product made with a fiber glass mat.

Figure 3:
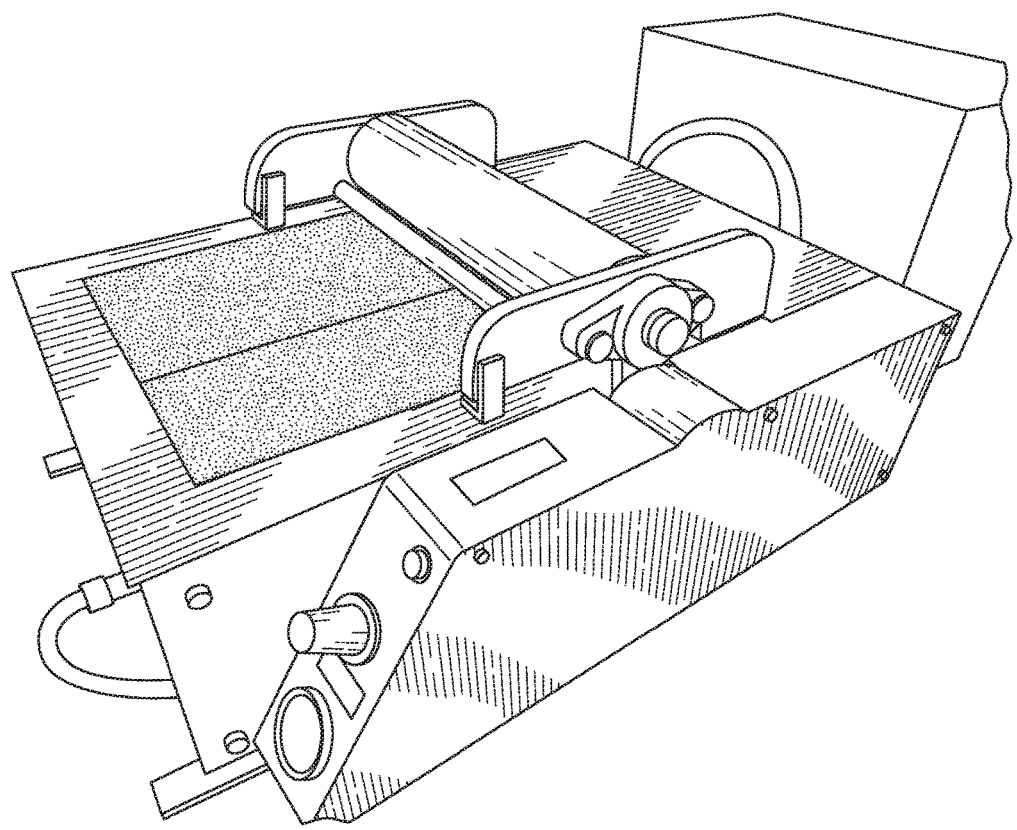
FIG. 3 is a roll press test set up.

As shown in FIG. 3, a roll press can be used to evaluate the tensile strength of various face materials. As shown in Table 2, a paper facer retains its tensile strength in both machine direction (MD) and cross direction (CD) after being pressed in a roll press at 60 psi, indicative that this product can withstand load and pressure and retain its mechanical properties after being exposed to pressure and load. However unlike the paper facer, the tensile strength of a glass fiber mat is decreased significantly after the exposure to pressure and load.

TABLE 2

|  | Control 4A | 60 psi 4B |
|---|---|---|
| Duraglass 8924G | | |
| Basis Weight (#/MSF) | 23.0 | |
| Caliper (mils) | 25.8 | 13.7 |
| Density (lb/ft₃) | 10.7 | 20.1 |
| Porosity (sec/100 cc) | Low | |
| MD Tensile (lb_f/2") | 100 | 8 |
| CD Tensile (lb_f/2") | 85 | 2 |
| Duraglass 8924 | | |
| Basis Weight (#/MSF) | 23.8 | |
| Caliper (mils) | 24.3 | 13.8 |
| Density (lb/ft₃) | 11.7 | 20.7 |
| Porosity (sec/100 cc) | Low | |
| MD Tensile (lb_f/2") | 117 | 16 |
| CD Tensile (lb_f/2") | 93 | 5 |

| Paper | Control 1A | 60 psi 1B |
|---|---|---|
| Basis Weight (#/MSF) | 46.8 | |
| Caliper (mils) | 14.2 | 11.4 |
| Density (lb/ft₃) | 39.5 | 49.3 |
| Porosity (sec/100 cc) | 69 | 97 |
| MD Tensile (lb_f/2") | 164 | 160 |
| CD Tensile (lb_f/2") | 64 | 64 |

A further embodiment provides a method for improving the elasticity of a glass fiber mat by soaking the glass fiber mat in an acrylic resin and letting the resin cure and cross-link the fibers of the fiber glass mat. This method improves the fiber-to-fiber bonding in the glass fiber mat. The method also prevents the loss of tensile strength in a glass fiber mat under pressure. These properties are highly beneficial and permit manufacturing gypsum products at a lighter weight.

A method for treating a glass fiber mat with a thermo-setting acrylic binder further permits obtaining gypsum products with glass fiber mats such that the products are moisture-resistant, but yet elastic, durable and pressure-resistant.

The inventors have developed a method for preparing robust and durable gypsum products with glass fiber mats. In this method, a glass fiber mat is first pressed with a roller or by other means which can apply pressure to the glass fibers. This step in the method is referred to as "the pre-pressing." The pressure applied at the "pre-prepressing" step may vary and it depends on the glass fiber mat used. In some embodiments, the applied pressure at the pre-pressing step is up to 60 psi. After the pre-pressing, the glass fiber mat is treated with a thermosetting acrylo-polyester resin and is pressed again. The second pressing step is referred to as "the post-pressing." The step of post-pressing can be performed with a roller or by any other means that apply sufficient pressure to the glass fibers in the glass fiber mat. The level of pressure applied at the post-pressing step depends on a particular glass fiber mat. In some embodiments, the pressure at the post-pressing step is applied up to 60 psi. It will be appreciated that at least in some embodiments, the post-pressing step is applied before the thermosetting acrylo-polyester resin is cured by heat. Further, while in some embodiments a glass fiber mat is prepared by pre-pressing, treating with a thermo-setting acrylo-polyester resin and post-pressing, in other embodiments the step of pre-pressing, post-pressing or both can be omitted.

In further embodiments, a gypsum product is first prepared by depositing some gypsum slurry on a glass fiber mat, the mat in the gypsum product is then pre-pressed, treated with a thermosetting acrylic resin and then allowed to set. In further embodiments, the glass fiber mat in the gypsum product is post-pressed in addition to be pre-prepressed. The inventors have determined that the steps of pre-pressing and/or post-pressing when combined with a step of treatment with an acrylic resin improve the surface finish of a gypsum product and reduce the amount of resin used.

Surprisingly, a resulting gypsum product made with the treated glass fiber mat becomes resistant to pressure and its nail-pull strength is significantly enhanced. As shown in Table 3, up to 5 times of nail-pull strength was gained with glass fiber mats pre-pressed and treated with an acrylo-polyester resin relative to that were not treated.

TABLE 3

| Sample ID | Press @60 psi Before Resin | Press at 60 psi After Resin | Drying | Weight Before (#/MSF) | Weight After (#/MSF) | Resin Pickup (#/MSF) | Caliper (mil) | Porosity (sec per 100 CC) | Ave NP From GM (lb_f) |
|---|---|---|---|---|---|---|---|---|---|
| A | | Control | | 24.9 | NA | NA | 24.3 | 0 | 3.2 |
| B | No | Yes | No | 24.8 | 91.8 | 67.0 | 29.7 | 13.3 | 8.7 |
| C | No | Yes | Yes | 24.7 | 87.2 | 62.5 | 29.5 | 5.8 | 9.1 |
| D | Yes | Yes | Yes | 24.9 | 70.9 | 46.0 | 21.6 | 13.2 | 16.1 |
| E | Yes | Yes | No | 24.7 | 73.5 | 48.8 | 23.5 | 20.7 | 14.2 |

Figure 4:
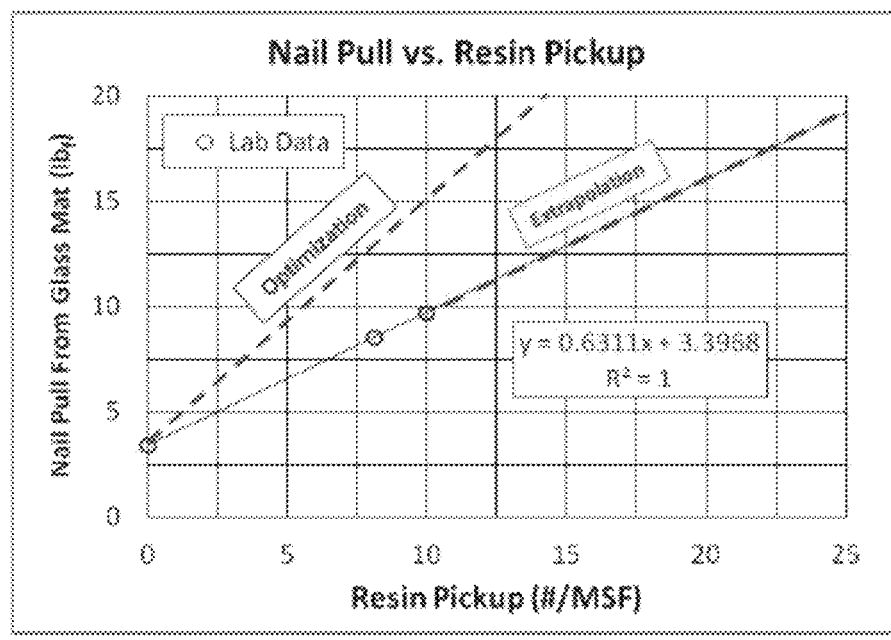
FIG. 4 is a graph showing improvement in a nail-pull strength for gypsum products made with glass fiber mats treated with a thermosetting acrylo-polyester resin.

As shown in FIG. 4, an optimal range for the amount of resin used, referred to as resin pickup, is from about 5 to about 20 pounds per one thousand square feet (lbs/MSF) of a glass fiber mat. This amount improves the nail pull strength of a glass fiber mat, as can be determined by a nail-pull test and as shown in FIG. 4.

A sufficient improvement in the tensile strength was also achieved when a resin was used at about 10 lbs/MSF. As shown in Table 4, glass fiber mats treated with a polyacrylic resin which was allowed to cure and crosslink glass fibers in the mat, gained significantly in a nail-pull strength test when the resin was used in the amount of 10 lbs/MSF in comparison to a glass fiber mat which was not treated with the resin.

TABLE 4

| | Glass Mat | | | Before | | | After | | | | Ave |
|---|---|---|---|---|---|---|---|---|---|---|---|
| ID | Pre-Press (psi) | Press After (psi) | Drying @400° F. | Basis Wt (#/MSF) | Caliper (mils) | Porosity (s/100 cc) | Basis Wt (#/MSF) | Caliper (mils) | Porosity (s/100 cc) | Resin Wt (#/MSF) | Nail Pull Gained (lb$_f$) |
| Control | | | | Untreated Glass Fiber Mat | | | | | | | 3.4 |
| A | 40 | 60 | 2 min | 24.9 | 23.8 | Low | 34.8 | 25.1 | Low | 10.0 | 9.7 |
| B | 60 | 60 | 2 min | 24.8 | 23.5 | Low | 32.9 | 20.4 | Low | 8.1 | 8.5 |

This invention will be further explained by means of the following non-limiting examples.

EXAMPLE 1

A piece of Manila paper was glued to a gypsum board in duplicates. A glass fiber mat (samples A and B) or paper facer (sample C) was then glued to one of each duplicates. All samples were then analyzed by a nail-pull strength test. As shown in Table 1, a sample with a paper facer (sample C) performs much better in a nail-pull test in comparison to samples A and B with glass fiber mats, suggesting that a glass fiber mat is brittle and weak in comparison to a paper facer.

EXAMPLE 2

Various gypsum board samples were analyzed by exposing them to pressure of 60 psi in a roll press. Gypsum board duplicate samples were either covered with a glass fiber mat (samples A and B) or with a paper facer (sample C). One of the duplicate samples was analyzed in a tensile strength test, while the other was subjected to pressure of 60 psi in a roll press, and then also analyzed in a tensile strength test, Unlike a gypsum sample made with a paper facer, samples made with a glass fiber mat did not retain its tensile strength after the exposure to pressure.

EXAMPLE 3

An experiment was conducted to examine the nail pull strength of glass fiber mat using a combination of pre-pressing, resin treatment, and post-pressing. A roll press at 60 psi was used to pre-press and post-press a glass fiber mat.

Glass fiber mats were pre-pressed with a roll press at 60 psi and then treated with an aqueous acrylo-polyester resin (NF4AD™) by soaking for 2 minutes in a 50% solids aqueous solution and then allowed to cure by drying in an oven at 400° F. for 2 minutes.

A gypsum board was prepared with the resin treated glass fiber mat and a glass fiber mat which was not treated with the resin. All samples were prepared in duplicates. Some samples were tested in a nail-pull test and their duplicates were exposed to a roll press with a pressure of 60 psi. The duplicates were then also tested in a nail-pull test. As shown in Table 3, gypsum boards prepared with resin-treated glass fiber mats gained 2 to 5 times of that from untreated control glass fiber mat. Thus, treating a glass fiber mat with an acrylo-polyester resin and letting it cure and cross-link the glass fibers makes the glass fiber mat less brittle. Pre-pressing and post-pressing improve surface finish as well as reduce resin usage. A resulting gypsum product is robust and durable.

EXAMPLE 4

Glass fiber mats were soaked in either 8.1 lbs/MSF or 10 lbs/MSF of an acrylo-polyester resin and allowed to cure as described above. Samples were then analyzed by a nail-pull up test. As shown in table 4, a significant improvement in a nail pull strength was achieved for a glass fiber mat treated with the resin at both concentrations in comparison to a glass fiber mat which was not treated with the resin.

While particular embodiments have been shown and described, it will be appreciated by those skilled in the art that changes and modifications may be made thereto without departing from the invention in its broader aspects and as set forth in the following claims.

What is claimed is:

1. A method for improving elasticity and surface finish in a gypsum product, the method comprising: mechanically pre-pressing an untreated glass fiber mat; treating the pre-pressed untreated glass fiber mat with an acrylic resin to form a treated glass fiber mat; optionally post-pressing the treated glass fiber mat; and preparing a gypsum slurry and disposing the slurry on the pre-pressed treated glass fiber mat, and thereby forming a gypsum product.

2. The method of claim 1, wherein the acrylic resin is an acrylo-polyester aqueous solution.

3. The method of claim 1, wherein glass fibers in the glass fiber mat are randomly oriented.

4. The method of claim 1, wherein the acrylic resin is used at about 10 lbs/MSF of the glass fiber mat.

5. The method of claim 1, wherein the step of treating the pre-pressed untreated glass fiber mat with the acrylic resin comprises: soaking the pre-pressed untreated glass fiber mat in an aqueous acrylic resin solution, and causing glass fibers in the pre-pressed untreated glass fiber mat to cross-link by curing the acrylic resin.

6. The method of claim 5, wherein the curing of the acrylic resin is accomplished by exposing the pre-pressed treated glass fiber mat to a temperature in the range from 2000 F to 5000 F.

7. The method of claim 1, wherein the acrylic resin is selected from the group consisting of a polyacrylate, acrylo-polyester and acrylo-polystyrene.

8. The method of claim 1, wherein the acrylic resin is an acrylo-polyester solution with 50% solids.

9. The method of claim 5, wherein at least one of the steps of soaking and curing takes place after the gypsum product has been formed.

* * * * *